United States Patent
Rege et al.

(10) Patent No.: US 7,713,333 B2
(45) Date of Patent: May 11, 2010

(54) ADSORBENTS FOR PRESSURE SWING ADSORPTION SYSTEMS AND METHODS OF USE THEREFOR

(75) Inventors: Salil Uday Rege, Amherst, NY (US); Mark William Ackley, East Aurora, NY (US); Jeffert John Nowobilski, Orchard Park, NY (US)

(73) Assignee: Praxair Technology, Inc., Danbury, CT (US)

( * ) Notice: Subject to any disclaimer, the term of this patent is extended or adjusted under 35 U.S.C. 154(b) by 749 days.

(21) Appl. No.: 11/642,905

(22) Filed: Dec. 20, 2006

(65) Prior Publication Data

US 2008/0148938 A1 Jun. 26, 2008

(51) Int. Cl.
*B01D 53/02* (2006.01)

(52) U.S. Cl. .............................. 95/96; 95/118; 95/139; 96/121; 96/130; 96/153

(58) Field of Classification Search ................. 95/96, 95/118, 139, 121, 130, 153
See application file for complete search history.

(56) References Cited

U.S. PATENT DOCUMENTS

| | | | |
|---|---|---|---|
| 3,972,686 A | 8/1976 | Johnson et al. | |
| 4,159,785 A | 7/1979 | Berry, Jr. | |
| 4,358,207 A | 11/1982 | Roth | |
| 4,518,262 A | 5/1985 | Bornemann et al. | |
| 4,711,645 A | 12/1987 | Kumar | |
| 4,755,061 A | 7/1988 | Goins | |
| 5,110,569 A * | 5/1992 | Jain | 423/230 |
| 5,232,474 A | 8/1993 | Jain | |
| 5,769,928 A | 6/1998 | Leavitt | |
| 5,779,767 A | 7/1998 | Golden et al. | |
| 6,027,548 A | 2/2000 | Ackley et al. | |
| 6,106,593 A * | 8/2000 | Golden et al. | 95/120 |
| 6,340,382 B1 * | 1/2002 | Baksh et al. | 95/96 |
| 6,358,302 B1 | 3/2002 | Deng et al. | |
| 6,638,340 B1 | 10/2003 | Kanazirev et al. | |
| 6,719,827 B2 | 4/2004 | Golden et al. | |

FOREIGN PATENT DOCUMENTS

| | | |
|---|---|---|
| DE | 3702190 A1 | 8/1988 |
| EP | 904 825 A2 | 3/1999 |

OTHER PUBLICATIONS

Kotoh et al., Journal of Chemical Engineering of Japan (1993), vol. 26, No. 4, pp. 355-360.
Chihara et al., "Simulation of Nonisothermal Pressure Swing Adsorption", Journal of Chemical Engineering of Japan (1983), pp. 53-61.
Rege et al., "Air-prepurification by Pressure Swing Adsorption Using Single/Layered Beds", Chemical Engineering Science (2001), vol. 8, pp. 2745-2759.

* cited by examiner

*Primary Examiner*—Robert A Hopkins
(74) *Attorney, Agent, or Firm*—Salvatore P. Pace

(57) ABSTRACT

The present invention relates generally to adsorbents for use in pressure swing adsorption (PSA) prepurification processes. The invention more particularly relates to the design of adsorbent zones to be used in PSA prepurification processes that are expected to provide for extensions in PSA cycle time, thereby reducing blowdown loss and operating costs associated with the process. One particular embodiment of the present invention includes a first adsorption zone containing activated alumina and a second adsorption zone of an alumina-zeolite mixture or composite adsorbent in which the volume of the first zone does not exceed 50% of the total volume of the first and second zone.

64 Claims, 6 Drawing Sheets

Schematic of PSA prepurifier bed design.

Schematic of PSA prepurifier bed design.

Design feed flux and specific bed capacity as a function of cycle time for a bed containing PS-201 composite in Zone 2. PSA cycle conditions given in Table 2.

Effect of the relative size of Zone 1 upon the $CO_2$ breakthrough concentration in the feed step of PSA cycle. PSA Cycle conditions given in Table 3.

Adsorbed loading profiles for $H_2O$ and $CO_2$ axially along bed length at the end of the feed (solid symbols) and purge steps (open symbols) for two different bed zone distributions (Examples 7 and 8)

(a) Example 7 (Zone 1=55.4%)

(b) Example 8 (Zone 1=37.5%)

Effect of cycle time on design feed flux at two adsorbent configurations. Data correspond to Examples 4,5,10 and 11 described in Table 4.

Increase in cycle time afforded by a corresponding decrease in design feed flux for a constant product impurity concentration at a fixed purge/feed flow ratio of 50%. Data is relative to Example 3 as baseline (12.5 minute cycle with a 55% first zone volume).

ADSORBENTS FOR PRESSURE SWING ADSORPTION SYSTEMS AND METHODS OF USE THEREFOR

TECHNICAL FIELD

The present invention relates generally to adsorbents for use in pressure swing adsorption (PSA) systems and methods of use therefor. The invention more particularly relates to adsorbents and adsorbent zones in PSA prepurifiers that allow for extensions in PSA cycle times and which can consequently lower blowdown losses and reduce operating costs associated therewith.

BACKGROUND OF THE INVENTION

Gas purification, more specifically air prepurification, represents a class of adsorption separation processes where multiple adsorbents can be applied to improve process performance. The operation of cryogenic air separation plants requires large quantities of pretreated air. To prevent freezing and plugging of the primary heat exchanger, the concentration in the pretreated air of contaminants or impurities such as $CO_2$ and $H_2O$ are required to be lowered to less than 1 ppm. In addition, the concentration of light hydrocarbons such as acetylene which have a low solubility in cryogenic liquids must be kept very low, typically less than 1 ppb, to prevent accumulation within the cryogenic distillation system. Nitrogen oxides (e.g., $N_2O$) also need to be removed to the sub ppm level.

Removal of contaminants or impurities can usually be accomplished by an adsorption process employing two or more vessels containing one or more adsorbents selective towards the impurities. When an adsorption bed is saturated with impurities, the bed needs to be regenerated by either one or a combination of two different general methods: pressure swing adsorption (PSA), during which a change in pressure is utilized to regenerate the sorbent, or temperature swing adsorption (TSA), during which the impurities are desorbed by using a thermal driving force such as a heated purge gas. The TSA process may also optionally superimpose a pressure swing to enhance its regeneration capability and reduce its purge requirement. The TSA process usually requires a much lower amount of purge flow relative to the PSA process and affords a longer cycle time, typically in the range of about 4-10 hours. On the other hand, the PSA process typically requires a greater amount of purge flow and has a much shorter cycle time, on the order of 10-50 minutes. The PSA process, however, can operate with ambient feed temperatures contrary to the TSA process, which typically needs a feed cooled to sub-ambient temperature by means of a refrigeration system. Moreover, there is no requirement for regeneration heat energy in PSA as opposed to TSA.

When there is sufficient waste nitrogen available from a cryogenic air separation plant, the nitrogen can be used as the purge flow gas as it typically contains no impurities and would otherwise be vented. Accordingly, when such nitrogen is available, PSA is therefore usually a preferred option for air prepurification due to its simplicity, lower capital cost as well as lower operating cost.

Notwithstanding the advantages of the PSA process compared to the TSA process, PSA processes have been limited in that the adsorbents are typically not completely regenerated at the completion of the purge step. Consequently, the bed dynamic capacity is less than it would be for a TSA process. As a result, the PSA process is typically run for short cycle times which thus necessitates that the bed(s) undergo blowdown and repressurization at fairly frequent intervals. During the blowdown step, there is a noticeable loss of air trapped within the void spaces of the vessel(s) and piping as well as the air adsorbed on the adsorbents therein. This collective air loss, referred to by various terms such as blowdown loss, vent loss or bed switch loss, can represent a significant energy waste as the air is compressed but not utilized for air separation downstream of the prepurifier. Reducing the blowdown loss can provide significant operating cost savings in terms of reduced compression power.

There are other disadvantages associated with frequent bed switches in a PSA cycle. For example, in a dual bed PSA process, the repressurization phase can cause upsets in the flow of purified air to the cryogenic distillation columns downstream of the prepurifier. Such frequent flow fluctuations can disturb the dynamics of the distillation process, thus resulting in lower efficiency for air separation in addition to causing a variation in the product purity.

Most prior art techniques to reduce or minimize the blowdown loss in a PSA process have focused on the reduction of the co-adsorption of the bulk components of air, namely $O_2$ and $N_2$, on a per cycle basis. Such techniques prompt the selection of an adsorbent configuration with a larger proportion of a weak adsorbent such as activated alumina which has very low capacity for $O_2$ and $N_2$, and a relatively smaller proportion of the stronger adsorbent, such as a molecular sieve.

An alternative approach to lower the power requirement of the PSA process is to reduce the frequency of the blowdown or bed switch loss mentioned above. This can be accomplished by extending the cycle time for which the bed is kept online prior to being switched to regeneration. Because the adsorbents and the bed configurations described in the prior art typically afford fairly modest dynamic capacities for impurity removal, an increase in cycle time would require either reducing the feed flow significantly at a fixed bed size, or require a significant increase in the bed size at a fixed feed flow rate. Both of these options can have adverse consequences on the capital and operating costs of the PSA prepurification process.

K. Chihara and M. Suzuki, "Simulation of Nonisothermal Pressure Swing Adsorption," Journal of Chemical Engineering of Japan, Vol. 16, No. 1, pg. 53-61 (1983) describe a computer simulation study of a non-isothermal PSA case study involving the drying of air using a single layer bed composed of either activated alumina or silica gel. An optimization of various process parameters such as bed length, cycle time and purge to feed ratio was presented. It is suggested from this work that an increase in adsorption cycle time would either require a longer bed length or a higher purge to feed ratio to maintain the product purity at a desired level.

German Patent Application DE 3,045,451 A1 (1981) describes a PSA process in which air is passed through a first stage having 13× zeolite to remove $CO_2$ and $H_2O$ in their high concentration zones, and then through a second stage having activated alumina to remove the remaining $CO_2$ and $H_2O$ in their low concentration zones.

U.S. Pat. No. 4,711,645 to Kumar proposes a PSA process with improved energy savings relative to conventional TSA processes. The PSA process includes feeding air through an initial layer of alumina for $H_2O$ removal followed by a bed of zeolite for $CO_2$ and residual $H_2O$ removal. The lower heat of adsorption of $H_2O$ in alumina compared to that of water in zeolite reportedly results in a smaller temperature rise and improves the bed capacity for $CO_2$ removal in the downstream layer of zeolite.

U.S. Pat. No. 5,232,474 to Jain relates to a PSA process in which an alumina layer is reportedly designed to remove at least 75 mole percent of the $CO_2$ present in a feed stream containing at least 250 ppm of $CO_2$. The feed may optionally be passed through a second adsorption zone containing a zeolite such as 13x to remove residual $CO_2$ and hydrocarbons. In such layered configurations, the alumina occupies more than 80% of the total bed volume.

U.S. Pat. No. 5,769,928 to Leavitt discusses a PSA bed composed of at least two discrete layers of adsorbents, at least one of the adsorbents being comparatively strong and at least another of the adsorbents being comparatively weak with respect to the adsorption of water and other contaminants. More specifically, the patent relates to the use of a comparatively weaker adsorbent such as activated alumina, followed by a stronger adsorbent such as NaY. This configuration is said to ensure a consistent breakthrough of $CO_2$ ahead of the $C_2H_2$ front, providing improved plant safety.

U.S. Pat. No. 5,779,767 to Golden et al. relates to a mixture of adsorbent composed of activated alumina (or an alkali-modified alumina) and a zeolite without maintaining the two adsorbents in separate beds or layers for the removal of various air impurities. Such a bed design reportedly has a high working capacity for $CO_2$ to reduce bed size. In addition, the adsorbents are said to have high reversible capacity for acetylene, water and nitrogen oxides.

The use of an activated alumina and zeolite composite or a homogeneous mixture formed by blending beads of activated alumina and zeolite for the removal of $CO_2$ from feed streams is also disclosed in Jain, et al., EP 0 904 825 A2. $H_2O$ in the feed may be removed in the mixed alumina-zeolite layer itself or by using a preliminary layer containing a desiccant such as activated alumina or silica gel.

Ackley et al., in U.S. Pat. No. 6,027,548, propose a PSA prepurifier bed composed of a mixture or a composite of at least two adsorbents, one of which is comparatively strong (e.g., NaY or NaX) and the other which is comparatively weak (e.g., activated alumina). Such a bed configuration is said to preferentially adsorb acetylene or $C_3$-$C_8$ hydrocarbons over $CO_2$ and is self-cleaning with respect to these contaminants at a lower purge than that required by 13x zeolite. A preferred embodiment is to utilize activated alumina near the feed end and the mixed adsorbent near the product end of the bed.

The removal of $CO_2$ and $H_2O$ from air using a layered bed of γ-alumina and 13x zeolite using numerical computer simulations is discussed in Rege et al., "Air-Prepurification by Pressure Swing Adsorption Using Single/Layered Beds," Chemical Engineering Science, Vol. 56 No. 8, pg. 2745-2759 (2001). At certain fixed process conditions such as constant bed length, purge to feed ratio, feed flow and cycle time, the relative proportion of alumina and 13x zeolite layer heights in the bed were varied to reportedly optimize the design. The authors concluded that a minimum impurity concentration results when the ratio of alumina to the zeolite is 7:3.

Given the growing cost of energy worldwide, there is an increasing need to reduce power and increase the operational efficiency of the PSA prepurification process. In view of the teachings of the prior art, it would therefore be desirable to provide an adsorbent zone configuration suitable for use in a PSA prepurifier that allows for extension in PSA cycle times and that can lower blowdown loss and reduce operating costs associated therewith.

BRIEF SUMMARY OF THE INVENTION

The present invention relates generally to adsorbent bed compositions and configurations for use in pressure swing adsorption (PSA) processes for purifying gas streams containing at least $H_2O$ and $CO_2$ as impurities. The present invention also relates to methods of using such compositions and configurations in pressure swing adsorption (PSA) processes for purifying gas streams containing at least $H_2O$ and $CO_2$ as impurities. More specifically, the compositions and methods of the present invention relate to passing gas streams over at least one bed containing at least two zones of adsorbents in an adsorption step. The first zone includes at least one layer having at least a first adsorbent that is water-selective. The second zone includes at least second and third adsorbents combined as either a mixture or a composite.

The first adsorbent is selected from activated alumina, silica gel and mixtures thereof. The second adsorbent is selected from: activated alumina, silica gel and mixtures thereof and the third adsorbent includes a zeolite or a mixture of zeolites. The volume of the first zone is not more than 50% by volume of the total volume of the first and second zones. In other embodiments, the volume of the first zone is not more than 40% by volume of the total volume of the first and second zones. In yet other embodiments, the volume of the first zone is not more than 35% by volume of the total volume of the first and second zones. In some cases, it may be preferred for the volume of the first zone to be between 35-40 volume percent of the total volume of the first and second zones.

Adsorbent zones prepared in accordance with the present invention allow for extensions in PSA cycle times, thus reducing the frequency of blowdown losses and thereby reducing the operating costs of the process. In some embodiments, these improvements can be realized with no substantial increase in the bed size or the purge/feed flow ratio and while maintaining the purity of the product.

The present invention also demonstrates that the specific bed capacities of PSA beds to adsorb impurities can be increased substantially as the cycle time is increased. As a result, it was discovered that it is possible to operate PSA prepurifiers at considerably increased adsorption cycle times at a fixed purge to feed ratio with a smaller than expected reduction in the design feed flux in the bed. One consequence of this discovery is that a small reduction made in the design feed flux in the prepurifier bed by selecting a larger bed flow area can lead to a relatively large increase in PSA cycle time. The small increase in capital cost of a larger diameter vessel can be more than offset by the reduction in operating cost. In other embodiments of the present invention, prepurifier plants can be operated at reduced or turndown capacities. In such embodiments, the reduced feed flux to the bed can be exploited by making a relatively larger increase in the cycle time to obtain power savings.

The present invention thus provides systems and methods for reducing power requirements for PSA prepurifiers by allowing for extensions of PSA cycle times without adversely impacting the overall cost of the process and its equipment.

BRIEF DESCRIPTION OF THE DRAWINGS

For a more complete understanding of the present invention and the advantages thereof, reference is made to the following Detailed Description taken in conjunction with the accompanying drawings in which.

DETAILED DESCRIPTION

Figure 1:
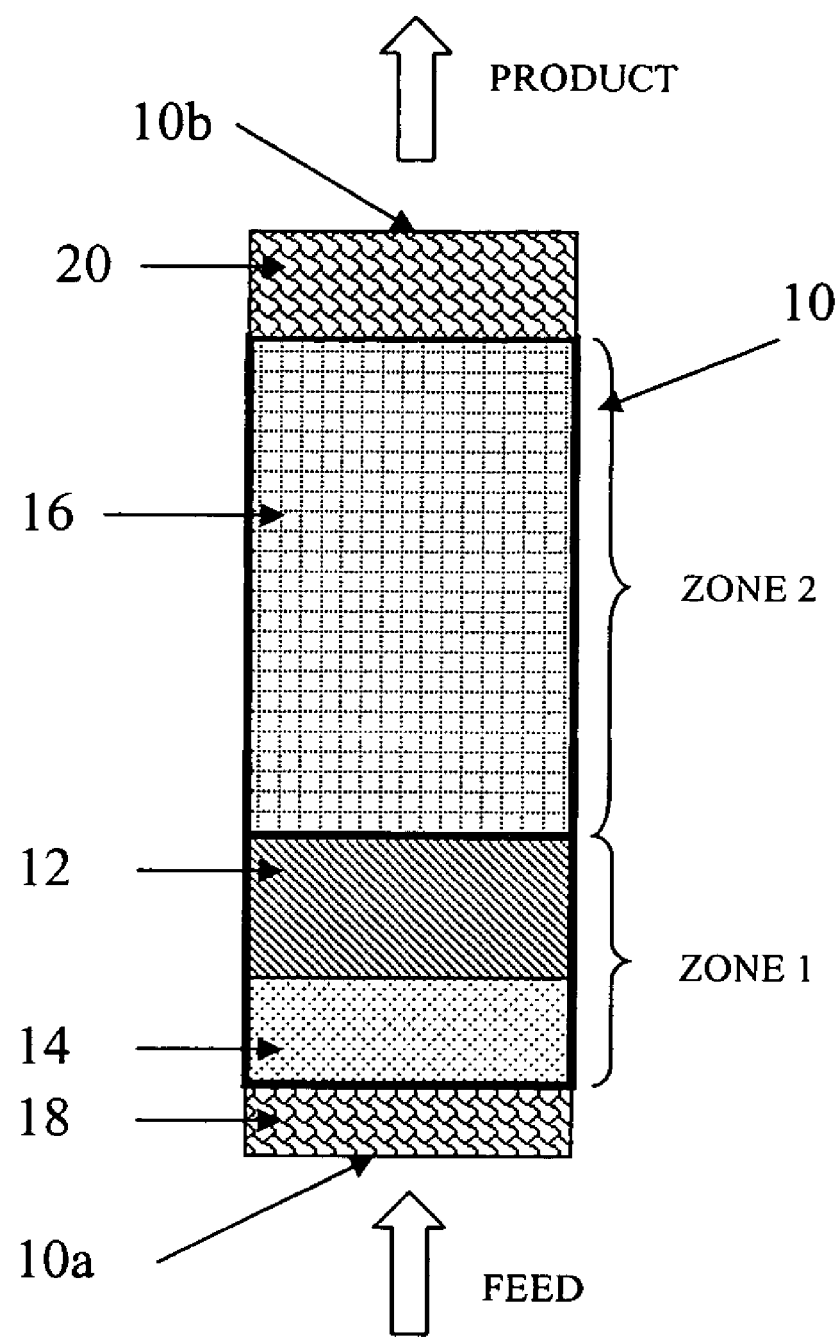
FIG. 1 illustrates an adsorbent bed configuration having different adsorbent zones in a PSA prepurifier in accordance with the present invention.

As mentioned above, the present invention relates generally to adsorbents and adsorbent compositions for use in pressure swing adsorption (PSA) prepurifiers. The invention more particularly relates to adsorbent zone configurations in PSA prepurifier beds that can result in higher specific bed capacities and extended PSA cycle times. The present invention further relates to methods of using such adsorbent compositions and configurations. Adsorbent zone configurations in accordance with the present invention can decrease blowdown loss and reduce operating costs of PSA processes.

PSA cycles typically use two or more beds to ensure continuity of feed. In general, the steps in a cycle are as follows: (1) adsorption (feed) at high pressure, (2) countercurrent blowdown (vent) to low pressure, (3) countercurrent purge with a gas relatively free of impurities, and (4) repressurization to high pressure with either feed air or purified air. Regeneration of adsorbents in PSA processes is thus achieved by a combination of a reduction in pressure and purge with an impurity-free gas, for example waste $N_2$ available from a cryogenic air separation unit. Typical feed pressures for PSA prepurifiers are 30-300 psia, and purge pressures are 14.5-30 psia. Those skilled in the art will appreciate that other steps in the process such as bed equalization may also be included. The steps in the cycle can be operated out of phase for one bed relative to the other bed(s).

The amount of purge flow is important for the normal operation of a PSA prepurifier as it ensures the self-cleaning of the bed. By self-cleaning, it is meant that the amount of purge is sufficient to result in the desorption of at least the same quantity of impurities during the regeneration steps as entered the bed during the feed step. In other words, the amount of purge flow is important so as to prevent residual loading of impurities from accumulating in the bed over subsequent cycles until a complete breakthrough of impurities occur. As used herein, the purge/feed flow ratio or (P/F) is the ratio of the flow rate of purge gas to the flow rate of the feed air, wherein the flow rates are measured in cubic feet per hour at a standard or normal temperature and pressure (NTP). Because the PSA regeneration method is typically weaker than the use of thermal energy as in a TSA process, the required P/F ratio is usually much higher in PSA than in TSA. Typical ranges of P/F ratios for PSA plants are 30-70%. It is also likely for there to be considerable residual loading of the impurity adsorbate remaining on the adsorbents even at the end of the regeneration step of a PSA cycle. The difference between the adsorbate bed loading at the end of the feed step and that at the end of purge step is known as the dynamic capacity. The dynamic capacity can be a function of the various operating conditions such as feed and purge pressure, temperature, P/F and can also be dependent on the selectivity and capacity of the adsorbent(s).

Prior to the present invention, one skilled in the art would expect that for a fixed set of PSA conditions such as feed temperature, pressure, impurity concentration and purge/feed ratio, the dynamic capacity of the adsorbent(s) will remain unchanged with cycle time. Thus for example and for purposes of illustration, increasing the amount of impurities to be adsorbed in the prepurifier caused by an extended feed step time of about 10%, would require either a compensating reduction in flow or an increase in bed length by about 10%. For example and as discussed above in connection with the Chihara and Suzuki reference, an increase in cycle time would be expected to require compensating action such as an increase in bed length or increase in P/F ratio. In practical situations, however, PSA plants are typically designed for a given air flow rate. Increasing the cycle time in order to lower the blowdown loss is therefore not considered practical as it would be expected to result in either a substantial reduction in the design feed flux or an increase in bed length, both of which could result in an increase in the capital cost of the plant.

Contrary to prior art teachings to reduce or minimize blowdown loss by reducing the co-adsorption of the bulk components of air, namely $O_2$ and $N_2$, on a per cycle basis, the present invention recognizes that in addition to reducing the blowdown loss per cycle, it is also important to reduce the frequency of this loss by increasing the adsorption cycle time. Although this can be accomplished by increasing the bed size, there is a capital cost penalty associated with such increase due to an increase in vessel size and materials. Hence, there is a need for bed designs which can enable longer PSA cycle times and lower blowdown losses without substantially increasing the capital and operating cost of the process. The extended PSA cycle time has the additional benefit of reducing the frequency of repressurization and hence that of the flow fluctuation to the cryogenic distillation columns downstream of the prepurifier. The net result can be a smoother and more efficient operation of the cryogenic distillation columns resulting in further power savings and reduced fluctuations in the purity of the products of air separation or other gas separation processes.

In accordance with the present invention, pressure swing adsorption (PSA) processes and systems for removal of impurities such as $H_2O$, $CO_2$, hydrocarbons, nitrogen oxides ($N_xO_y$) and the like from air prior to cryogenic distillation or from other gas streams include at least one vessel having at least at least two adsorbent zones therein. The first zone of the bed contains at least one first layer of an adsorbent that is water-selective and that has a weak capacity to adsorb bulk air gases. The bed also contains a second zone having at least second and third adsorbents combined as a mixture or a composite. The volume of the first zone is not more than 50% by volume of the total volume of the first and second zones.

More specifically and with reference to FIG. 1, adsorbent vessel or bed 10 contains at least one layer of adsorbent 14 located in the proximity of the feed end 10a of bed 10. The adsorbent(s) in zone 1 are primarily intended for moisture removal and include one or more adsorbent layers 12, 14 which have a high capacity for $H_2O$, are easily regenerable under PSA conditions, and have a comparatively weak adsorption capacity for the bulk atmospheric gases such as $N_2$ and $O_2$. Examples of such adsorbents include activated alumina, silica gel, composites of silica-alumina and mixtures or combinations of these.

The second zone in accordance with the present invention, located in the proximity of the product end 10b of the bed, is primarily intended for the removal of $CO_2$, hydrocarbons, $N_2O$, and the like and includes at least one layer 16 of a physical particle mixture or a composite. The second zone includes at least second and third adsorbents, the second adsorbent being selected from activated alumina, silica gel, composites of silica-alumina and mixtures or combinations thereof, and the third adsorbent being a zeolite or mixture of zeolites. The alumina in the second zone is not only $CO_2$-selective relative to the bulk gases, but also functions as a thermal capacitor. More specifically, the second adsorbent in the second zone is a weaker adsorbent relative to the third adsorbent in the second zone (e.g. zeolite) and therefore will not adsorb the bulk gases (e.g., $N_2$ and $O_2$) to an appreciable extent thus reducing the extent of thermal swing during PSA due to adsorptive effects.

As mentioned above, the first zone according to the present invention contains a water-selective adsorbent such as an activated alumina layer 12. Layers 12, 14 of such alumina in graded sizes (7×14, ¼ in., ⅛ in., etc.) may be used to provide better flow distribution and bed support. In one exemplary embodiment for example, layer 12 can be a layer of activated alumina of ⅛ inch bead size and layer 14 can contain a layer of activated alumina of 7×14 bead size. Alternatively, other dessicants such as silica gel or silica-alumina composites or mixtures thereof could be used instead of activated alumina. Inert ball supports 18 such as ceramic balls (e.g., ¼ inch inert balls) could be used below the alumina layer for providing bed support, flow distribution and regenerative thermal cooling to the feed flow.

The second zone in accordance with the present invention is formed of a layer 16 of a composite blend or a physical mixture of at least second and third adsorbents. As used herein, a "mixture" of adsorbents is a physical blending of individual particles (e.g., beads) of two more different adsorbents (e.g., activated alumina and zeolite) so as to form a uniform distribution of the different adsorbent components throughout the bed layer 16. As also used herein, a "composite" is an adsorbent containing a blend of one or more adsorbents and an optional inert binder which are either physically or chemically bonded together into an integral adsorbent structure (bead, pellet, preform, etc.). Thus, each individual bead of a composite will contain one or more adsorbents or adsorbent phases.

The second adsorbent in zone 2 is selected from activated alumina, silica gel, composites of silica-alumina and mixtures or combinations thereof and the third adsorbent contains a zeolite or mixture of zeolites. For example and while not to be construed as limiting, a composite blend or physical mixture of 13× zeolite and alumina mixtures or composites could be used for the second zone in accordance with the present invention.

The third adsorbent is a stronger adsorbent than the second adsorbent and is intended to remove low concentrations of impurities. Zeolites with a silica:alumina ratio of less than ten would typically fulfill the requirements of the present invention, although zeolites of types A, X or Y are most preferred. The cation could be chosen from Group 1A, 1B, 2A, 2B, 3B, 7B, 8 or combinations of these, but the $Na^+$ exchanged form is preferred. The composite or mixture may be composed of a single type of zeolite (e.g., X) or a mixture of two or more of different types (such as A, X and Y). In a preferred mode, the second zone is composed of a NaX zeolite-alumina composite or mixture. The composition of the zeolite (not including any binder, if present) in the zeolite-alumina mixture or the composite adsorbent could be in the range of 5-95 weight %, preferably from 20-60 weight %, and most preferably from 30-45 weight %. It is understood in the art that commercially available shaped zeolite adsorbents to be used in the adsorbent mixture could either be a bound product containing typically 10-25 weight percent binder or could be a binderless product with essentially all of the binder converted to a zeolite. The composite adsorbent or one of the components of the mixed components could be further doped with a metal oxide or an alkaline material to enhance its adsorption capacity. Examples and manufacture of such composites, other alumina-zeolite composites and alumina-zeolite particle mixtures and their uses in prepurifiers can be found for example in U.S. Pat. No. 6,638,340 B1 to Kanazirev et al; U.S. Pat. No. 5,779,767 to Golden et al; U.S. Pat. No. 6,027,548 to Ackley et al; U.S. Pat. No. 6,358,302 to Deng et al; and European Patent Application No. EP 0 904 825 A2 to Jain et al; all of which are incorporated herein by reference.

While not to be construed as limiting, zone 2 could be formed using a layer of a composite adsorbent such as the material available from UOP, LLC of Des Plaines, Ill. under the designation PS-201. In other embodiments, zone 2 may be formed using a mixture of 13×APG zeolite (a zeolite which contains a binder and can be for example of 8×12 size) and D-201 alumina (e.g., of 7×12 size), both materials being commercially available from UOP, LLC.

Inert ball supports 20 such as ceramic balls (e.g., ¼ inch inert balls) could also be used above zone 2 to provide ballast and prevent accidental fluidization of the bed, as well as to provide flow distribution for the purge gas.

It may also be possible to alter or select different particle sizes for the layers and/or zones of activated alumina, silica gel, zeolite or composite adsorbents to enhance mass transfer or to alter the pressure drop characteristics of the bed. As used herein, "variable composition mixture" is one in which the composition of the mixture with respect to its individual components is uniform in the direction perpendicular to the flow direction, but non-uniform in the direction of the flow of gas. For example, in the case of a vertical cylindrical vessel, the composition will be uniform in the radial direction, but varying in the axial or vertical direction. In one embodiment of a variable composition mixture, the composition is varied in the form of a steadily increasing or decreasing gradient along the height of the adsorbent layer. For purposes of illustration and while not to be construed as limiting, a variable composition mixture in zone 2 could include a mixture of about 40 weight percent zeolite (for example, NaX) and 60 weight percent activated alumina at a first end of the second zone proximate to the first zone, with such mixture further characterized by a composition gradient that results in a composition of about 60 weight percent zeolite (for example, NaX) and 40 weight percent activated alumina at a second end of the second zone proximate to the product end of the vessel.

While the description provided primarily discusses a bed configuration having two zones, it is within the scope of the present invention to add additional layers of different adsorbents above the second zone functionalized for removal of certain additional impurities such as nitrogen oxides, hydrocarbons, CO, $H_2$, etc. Additionally, a layer of inert ball supports may be added either in between the first zone and the second zone or on top of the bed for regenerative effect and/or to prevent fluidization of the bed. The concepts described herein could also be applied to a range of process conditions such as feed and purge pressure, temperature, and purge to feed ratio.

The present invention has been designed for prepurification of air prior to cryogenic distillation. Other applicable separations for the present invention include removal of trace quantities of moisture and $CO_2$ from any inert gas stream such as $N_2$, Ar, He, $H_2$ or the like.

According to the present invention, the first zone is configured such that its volume is less than 50% of the total volume of the first and second zones. Such a configuration has been found to allow for improved specific bed capacity for impurities and enable a longer cycle time relative to a bed design in which the volume of the first zone is more than 50% of the total volume of the two zones. In other embodiments, the volume of the first zone is not more than 40% by volume of the total volume of the first and second zones. In yet other embodiments, the volume of the first zone is not more than 35% by volume of the total volume of the first and second zones. In some cases, it may be preferred for the volume of the first zone to be between 35-40 volume percent of the total volume of the first and second zones.

In accordance with the present invention, it has been unexpectedly observed that the specific bed capacity of the prepurifier bed can increase considerably as the PSA cycle time is increased. As used herein, the specific bed capacity is the total amount of air purified per cycle per unit volume of adsorbent in the bed at a given product $CO_2$ impurity concentration. While not intending to be limiting, the examples hereinbelow (except Example 12) refer to a product $CO_2$ impurity specification of 0.1 ppm. The specific bed capacity to remove impurities from air in each cycle can be calculated using Equation (1):

$$\text{Specific bed capacity} = \frac{\text{Total amout of air purified per cycle } (NCF)}{\text{Total volume of active absorbent } (ft^3)} \quad \text{(Equation 1)}$$

$$= \frac{\text{Feed flowrate (at } NTP) \times \text{Feed step time}}{\text{Total volume of active absorbent}}$$

The volume of "active adsorbent" referred to in Equation (1) is the total volume of adsorbent in the first and second zones of the bed. The NTP conditions used in Equation 1 refer to 70° F. temperature and 14.696 psia (1 atm.) pressure.

It has been discovered that a substantial increase in cycle time can be obtained with a relatively small decrease in the design feed flux. For purposes of example and while not intending to be construed as limiting, for a 10% reduction in the design feed flux corresponding to a PSA cycle operating at 12.5 minutes, a 100-150% increase in cycle time (i.e. 2-2.5 times) may be possible depending on the particular bed zone configuration. This allows one skilled in the art to make a small reduction in the design feed flux in the prepurifier bed by increasing the bed flow area to obtain a relatively large increase in PSA cycle time.

In other embodiments, the present invention enables a reduction in the operating cost of existing PSA prepurifier plants which temporarily operate at a capacity lower than its designed capacity due to a reduction in customer demand. At the reduced feed flux, the present invention teaches that a substantial increase in cycle time is possible without compromising the purity of the product or the requirement for additional purge/feed flow ratio. This therefore provides the opportunity to substantially reduce the blowdown loss and obtain feed compression power savings.

The examples hereinbelow illustrate and exemplify features of the invention with the understanding that such examples do not limit the scope of the invention. In each example, a computer simulation, an experimental pilot plant test or an experimental field test has been used.

The computer simulations were performed by obtaining a numerical solution of a previously validated mathematical model which simultaneously solves the set of governing equations describing the dynamic mass, energy and momentum balances of the process. Some key assumptions made for the simulations include ideal gas law, non-isothermal adsorption, adiabatic bed, bed pressure drop described by the Ergun equation, and mass transfer kinetics modeled as a linear driving force with a lumped pressure-dependent mass transfer coefficient. The multicomponent equilibrium adsorption isotherms for $N_2$ and $CO_2$ were described by the loading ratio correlation (LRC), whereas that for $H_2O$ was described by a multilayer adsorption potential model given by Kotoh et al., *Journal of Chemical Engineering of Japan*, Vol. 26, No. 4, pg. 355-360, 1993. The reduction of adsorption capacity for $N_2$ and $CO_2$ due to $H_2O$ was calculated using an experimentally determined correlation. The validity of the multicomponent isotherms and the mass transfer coefficients was established by using the model to fit the breakthrough curves of the feed impurities at process conditions close to the PSA conditions used in this study. The simulations were run for several hundred cycles until cyclic steady state was reached, meaning the concentration and temperature profiles in the bed at the end of each cycle were identical to those at the end of its preceding cycle and the cyclic mass and energy balances were closed. The feed gas for the simulations contained nitrogen, carbon dioxide and water.

Experimental pilot plant tests were performed in either of two pilot plants. Each pilot plant contained two beds which alternately switched between the online mode to the regeneration mode as per the given PSA cycle conditions. Each bed in the pilot plant was thermally insulated and measured 97 in. in length with an inner diameter of either 3.26 in. or 4.26 in. depending on the particular pilot plant used. The feed used in the pilot plants was atmospheric air containing about 400 ppm $CO_2$ that was compressed and was further saturated with water vapor at the desired pressure and temperature conditions using a humidifier. Cyclic steady state was achieved after a few hundred cycles of continuous operation. The pilot plant was well instrumented with mass flow meters, thermocouples, and analyzers to measure the concentration of impurities such as $CO_2$, $N_2O$ and hydrocarbons such as $C_2H_2$ in the feed and product streams. The pilot tests were conducted at a desired cycle time by adjusting the feed flow such that the peak $CO_2$ concentration in the product at cyclic steady state measured about 0.1 ppm, which is a typical specification for prepurified air prior to cryogenic distillation. It was confirmed in all pilot tests that the $C_2H_2$ concentration in the product was below measurable levels (<1 ppb).

All flowrates described herein in the examples refer to a flow measured in NCFH, or normal cubic feet per hour, calculated at a reference temperature and pressure of 70° F. and 14.7 psia, respectively. The feed flowrate at a specified product $CO_2$ impurity concentration is referred to herein as the "design feed flow". Wherever there is reference in the Examples herein (except for Example 12) to a design feed flow, the product $CO_2$ impurity concentration for such design feed flow was selected to be 0.1 ppm. Other concentrations or specifications than $CO_2$ impurity, however, could be used to set the design feed flow. The "design feed flux" is used herein as the design feed flow divided by the cross-sectional flow area of the vessel. The purge/feed flow ratio was maintained at 50% during the pilot plant testing by adjusting the purge flow in direct proportion with the feed flow.

The term "cycle time" refers to the step time for the feed step, unless otherwise mentioned. It is understood that for a continuous-feed two-bed PSA operation, the total duration of a PSA cycle is twice the feed step time.

In the Examples, materials studied in the simulations and in the pilot plant and field tests included the following as indicated: inert ceramic ball supports (¼ in., ½ in. or 1 in.) commercially available under the designation Denstone D57 from Saint-Gobain N or Pro of Stow, Ohio, activated alumina commercially available from Alcoa Alumina and Chemicals, LLC of Pittsburgh, Pa., under the designation F-200 (⅛ in. or ¼ in.), activated alumina commercially available from UOP, LLC, of Des Plaines, Ill. under the designation D-201 (5×8 or 7×12), a zeolite-alumina composite available from UOP, LLC, of Des Plaines, Ill. under the designation PS-201 (7×14), and 13× (i.e., NaX) zeolite, also available from UOP, LLC of Des Plaines, Ill. as 13×APG (8×12). Wherever the composition of the alumina-zeolite mixture is given, it is understood to be weight percent unless otherwise indicated.

When using physical mixtures in the pilot plant examples, two different adsorbents (spherical bead form) were blended manually to create a uniform distribution of the two materials. This uniform mixture was then loaded into the second zone of the bed.

Examples 1-2

Computer simulations were conducted by modeling a cylindrical vessel with an inner diameter of 3.26 inch and measuring 97 inches in length. The vessel contained the bed layer arrangement given in Table 1. Thus the first zone contained two activated alumina layers with the total bed height measuring 46.5 inches, while the second zone contained the composite layer measuring 37.5 inches in length. In other words, the volume of the first zone consisted of 55.4% of the sum of the volumes of the first and second zones.

TABLE 1

PSA bed adsorbent layer configuration used in Examples 1-5 (in stacked order, starting from the feed end of bed).

|  | Layer height (in.) |
|---|---|
| Inert ball support (¼ in.) | 8 |
| Zone 1: | |
| F-200 (⅛ in.) alumina | 9 |
| D-201 (7 × 12) alumina | 37.5 |
| Zone 2: | |
| PS-201 (7 × 14) composite | 37.5 |
| Inert ball support (¼ in.) | 5 |
| Total length (in.) | 97 |
| % First zone (alumina) in bed | 55.4% |

TABLE 2

PSA simulation of 25 minute and 32.5 minute cycle times with equal feed and purge flow rates.

|  | Example No. | |
|---|---|---|
|  | 1 | 2 |
| Feed conditions: | | |
| Pressure (psig) | 130 | 130 |
| Temp. (deg F.) | 105 | 105 |
| Feed flow (NCFH) | 831 | 831 |
| Feed flux (NCFH/ft²) | 14336 | 14336 |
| Feed $CO_2$ conc. (ppm) | 400 | 400 |
| Feed $H_2O$ conc. (ppm) | 7643 | 7643 |
| Purge conditions: | | |
| Purge pressure (psig) | 2 | 2 |
| Purge temp. (deg F.) | 95 | 95 |
| Purge flow (NCFH) | 414 | 414 |
| Purge/feed flow ratio | 49.8% | 49.8% |
| Cycle step time: | | |
| Feed time (min.) | 25 | 32.5 |
| Blowdown time (min.) | 0.5 | 0.5 |
| Purge time (min.) | 19.5 | 27.0 |
| Repress time (min.) | 5.0 | 5.0 |
| Cycle step time: | | |
| Product $CO_2$ (ppm) | 0.08 | 0.15 |

The above described bed was subjected to a PSA cycle simulation at two different cycle times of 25 minutes (Example 1) and 32.5 minutes (Example 2) with nitrogen containing 400 ppm $CO_2$ and saturated with water under conditions summarized in Table 2 hereinabove. The feed and purge flow rates at the two cycle times were maintained the same. The PSA simulations showed that the product $CO_2$ impurity concentration for the 32.5 minute cycle was higher (0.15 ppm) than that for the 25 minute cycle (0.08 ppm) as expected from the prior art. This observation indicates, as expected, all other operating conditions being kept constant, an increase in the PSA cycle time results in an increase in product impurity concentration. In practice, if this product impurity concentration exceeds its specified limit, then corrective actions such as a reduction in feed flux or an increase in purge flow will be required to maintain the product at the desired purity. Such actions will most likely have either a capital or an operating cost penalty associated with them.

Examples 3-5

Experiments were conducted in a pilot plant containing two beds measuring 4.26 in. inner diameter and containing a layering identical to that described in Table 1. The beds were subjected to PSA cycles with feed step time durations of 12.5 minutes, 25 minutes, and 32.3 minutes until cyclic steady state was reached in each case. In each case, the purge/feed flow rate ratio was maintained at 50% and the feed flow rate was adjusted so as to obtain a $CO_2$ product impurity concentration of approximately 0.1 ppm. The detailed PSA cycle conditions are shown in Table 3. The design feed flux had to be decreased as the cycle time increased in order to limit the $CO_2$ concentration in the product to the desired 0.1 ppm level.

Figure 2:
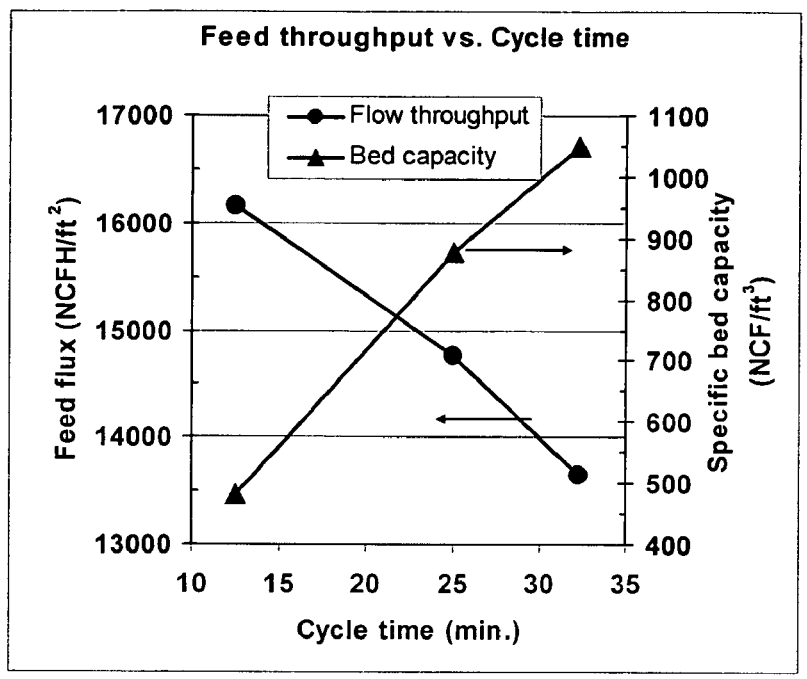
FIG. 2 is a graph illustrating the design feed flux and the specific bed capacity as a function of cycle time for an adsorption bed described herein for Examples 3-5 and as summarized in Table 2.

The specific bed capacity to remove impurities from air in each cycle was calculated for the different cycle times using Equation (1) given previously and is also shown in Table 3. It was found that the specific bed capacity increased as the cycle time was increased, as indicated in FIG. 2. As a result, the corresponding reduction in feed flux was significantly lower than expected.

TABLE 3

PSA cycle conditions used in Examples 3-5.

|  | Example No. | | |
|---|---|---|---|
|  | 3 | 4 | 5 |
| Feed conditions: | | | |
| Pressure (psig) | 130 | 130 | 130 |
| Temp. (deg F.) | 105 | 105 | 105 |
| Feed $CO_2$ conc. (ppm) | 400 | 400 | 400 |
| Feed $H_2O$ conc. (ppm) | 7643 | 7643 | 7643 |
| Feed flow (NCFH) | 1600 | 1460 | 1350 |
| Feed flux (NCFH/ft$^2$) | 16165 | 14750 | 13639 |
| Bed specific capacity (NCF/ft$^3$) | 481 | 878 | 1049 |
| Purge conditions: | | | |
| Purge pressure (psig) | 2 | 2 | 2 |
| Purge temp. (° F.) | 95 | 95 | 95 |
| Purge flow (NCFH) | 800 | 730 | 675 |
| Purge/Feed flow-rate ratio | 50% | 50% | 50% |
| Cycle step time: | | | |
| Feed time (min.) | 12.5 | 25 | 32.3 |
| Blowdown time (min.) | 0.5 | 0.5 | 0.5 |
| Purge time (min.) | 9 | 19.5 | 26.8 |
| Repress time (min.) | 3.0 | 5.0 | 5.0 |

Contrary to prior art teachings, one would not expect that the specific bed capacity of a PSA prepurifier would increase as the cycle time is extended. While not being bound by any particular theory, these results suggest that the slow mass transfer kinetics of $CO_2$ and $H_2O$ adsorption in PSA adsorbents is limiting the process. The slow kinetics may at least be partially attributable to the low concentration of the impurities in the feed air as well as the substantial residual loading in the bed at the end of regeneration in a PSA mode. Extending the cycle time could therefore allow more time for the contaminants to transact on and off the adsorbent and therefore improve the dynamic capacity of the adsorbents. This enables a more efficient regeneration of the sorbent and results in the removal of a greater quantity of impurities per adsorption cycle. It should also be noted that, in general, as the cycle time is extended the ratio of purge time to feed time also increases if the blowdown and repressurization times are kept constant. This results in an increase in the ratio of total amount of purge gas to the total amount of feed gas flowed through the bed over the duration of the step and hence may result in a better regeneration of the bed.

Example 6

A pilot plant test was conducted in a pilot plant with 3.26 in. inner diameter with a bed layer arrangement shown in Table 4 and PSA conditions and cycle time given in Table 5. In this Example, the Zone 2 consisted of 37.5 in. layer of a mixed adsorbent composed of 36% 13×APG zeolite (8×12) and 64% D-201 alumina (7×12). The pilot plant was subjected to PSA cycles with a feed time of 32.3 minutes for several days until cyclic steady state was reached. Simultaneously the feed flow-rate was adjusted keeping the purge/feed flow ratio constant at 50% such that the product $CO_2$ impurity concentration attained was about 0.1 ppm. The corresponding design feed flux obtained was 14,060 NCFH/ft$^2$ which is within 3% of that obtained using the PS-201 composite in Example 5 (13,639 NCFH/ft$^2$). Thus, the mixture of 13×APG zeolite and D-201 alumina in the second zone of this Example provides comparable performance to that containing the PS-201 in Example 5.

TABLE 4

PSA bed adsorbent layer configuration used in Example 6
(in stacked order, starting from the feed end of bed).

|  | Layer height (in.) |
|---|---|
| Inert ball support (¼ in.) | 8 |
| Zone 1: | |
| F-200 (⅛ in.) alumina | 9 |
| D-201 (7 × 12) alumina | 37.5 |
| Zone 2: | |
| 36% 13X APG (8 × 12), 64% D-201 alumina (7 × 12) mixture | 37.5 |
| Inert ball support (¼ in.) | 5 |
| Total length (in.) | 97 |
| % First zone (alumina) in bed | 55.4% |

TABLE 5

|  | Example No. 6 |
|---|---|
| Feed conditions: | |
| Pressure (psig) | 130 |
| Temp. (deg F.) | 105 |
| Feed $CO_2$ conc. (ppm) | 400 |
| Feed $H_2O$ conc. (ppm) | 7643 |
| Feed flow (NCFH) | 815 |
| Feed flux (NCFH/ft$^2$) | 14060 |
| Bed specific capacity (NCF/ft$^3$) | 1081 |
| Purge conditions: | |
| Purge pressure (psig) | 2 |
| Purge temp. (° F.) | 95 |
| Purge flow (NCFH) | 407.5 |
| Purge/Feed flow-rate ratio | 50% |
| Cycle step time: | |
| Feed time (min.) | 32.3 |
| Blowdown time (min.) | 0.5 |
| Purge time (min.) | 26.8 |
| Repress time (min.) | 5.0 |

Examples 7-9

Computer simulations were used to study the effect of the relative volumes (i.e., height) of bed zones on PSA performance in a vessel measuring 3.26 inches in diameter and 94 inches in length. The vessel contained, in the following order (starting from the feed end of the bed), an 8 inch layer of inert ceramic ball (¼ in.) support, a 9 inch layer of Alcoa F-200 (⅛ in.) alumina, an x inch layer of D-201 (7×12) alumina, a y inch layer of PS-201 (7×14) composite adsorbent, and a 5 inch inert ball support layer (¼ in.). The layer heights x and y were altered in Examples 7-9 such that the total height (x+y) remained constant at 75 inches. Thus the relative distribution of the first zone composed of the two alumina layers (measuring 9+x inches) and the second zone composed of the composite adsorbent (measuring y inches) was varied from 37-73% as shown in Table 6, which also describes the PSA cycle conditions used.

Figure 3:
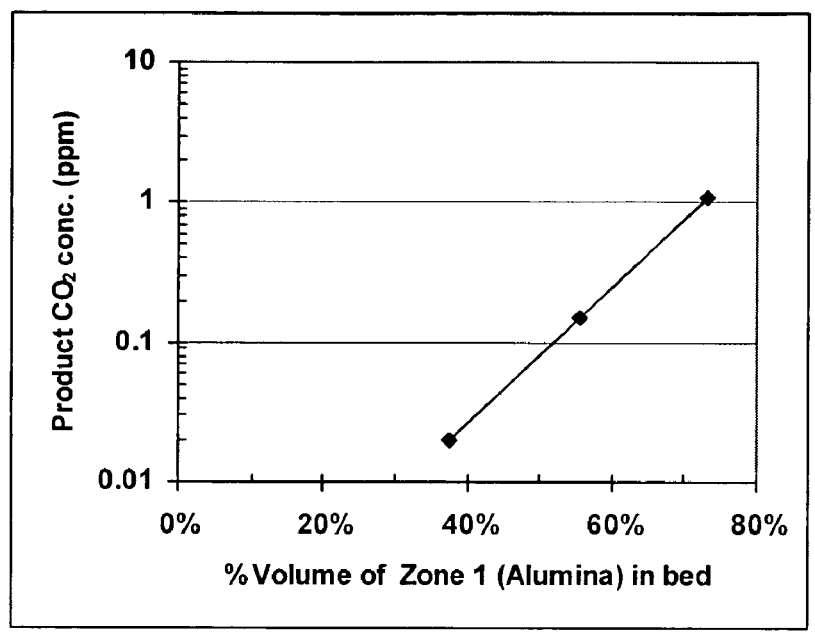
FIG. 3 shows the effect of the relative size of zone one upon the $CO_2$ breakthrough concentration obtained by PSA simulation as described hereinbelow for Examples 7-9 with conditions given in Table 3.

Each example simulation was conducted at the same operating conditions. The resulting $CO_2$ breakthrough concentrations at cyclic steady state are given in Table 6 and are shown in FIG. 3. It can be seen from FIG. 3 that as the proportion of first zone in the bed is reduced and that of the second zone is increased, the $CO_2$ impurity concentration in the product decreases, thus indicating an improvement in the PSA dynamic $CO_2$ capacity as the zone 1 (e.g. alumina) is reduced.

Figure 4:
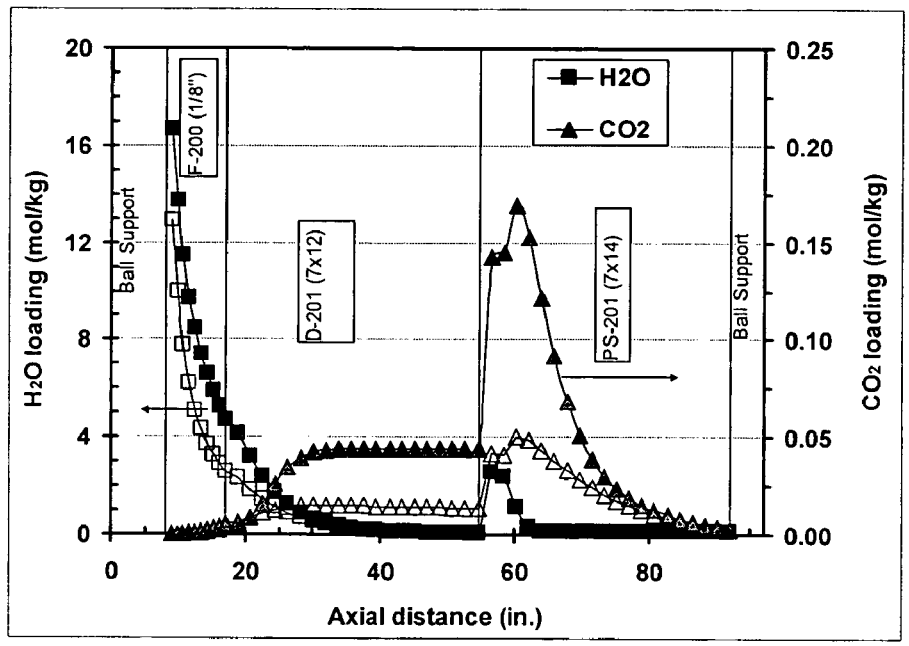
FIGS. 4(a) and 4(b) respectively illustrate the adsorption bed loading profiles for $H_2O$ and $CO_2$ axially along the bed length at the end of the feed and purge steps in accordance with Examples 7 and 8.
Figure 4:
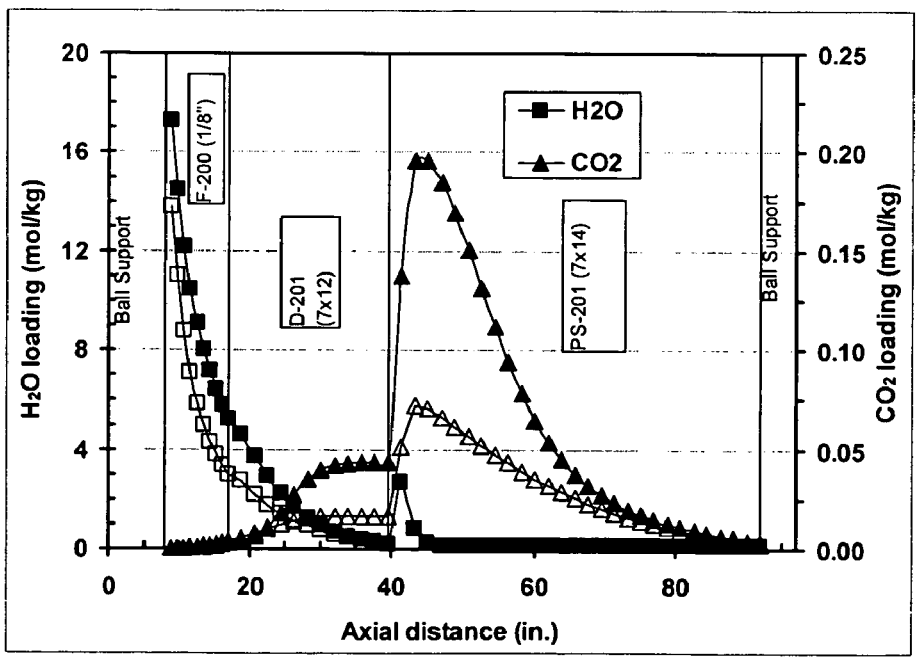

Further insight into the effect seen above can be obtained by examining the adsorbed loading $CO_2$ and $H_2O$ axial bed profiles at the end of the feed and purge steps. FIG. 4 shows such profiles for Examples 7 and 8. The difference between the bed loading at the end of the feed and purge steps represents the dynamic capacity or the useful capacity of the sorbent under PSA conditions. In general, the composite adsorbent (zone 2) has a higher dynamic capacity for $CO_2$ compared to the $CO_2$ capacity of alumina in zone 1. Hence, when the first zone is shortened and the second zone is expanded, the higher dynamic capacity of the zeolite-alumina composite is exploited to a greater degree. This is evident from the comparison of the area between the $CO_2$ loading curves for the two different zone distributions.

TABLE 6

PSA cycle conditions, layered bed configuration and simulation results for Examples 7-9.

| | Example No. | | |
|---|---|---|---|
| | 7 | 8 | 9 |
| Feed conditions: | | | |
| Pressure (psig) | 130 | 130 | 130 |
| Temp. (deg F.) | 105 | 105 | 105 |
| Feed flow (NCFH) | 830.7 | 830.7 | 830.7 |
| Feed $CO_2$ conc. (ppm) | 400 | 400 | 400 |
| Feed $H_2O$ conc. (ppm) | 7643 | 7643 | 7643 |
| Purge conditions: | | | |
| Purge pressure (psig) | 2 | 2 | 2 |
| Purge temp. (deg F.) | 95 | 95 | 95 |
| Purge flow (NCFH) | 413.7 | 413.7 | 413.7 |
| Purge/Feed flow ratio (%) | 49.8 | 49.8 | 49.8 |
| Cycle step time: | | | |
| Feed time (min.) | 32.5 | 32.5 | 32.5 |
| Blowdown time (min.) | 0.5 | 0.5 | 0.5 |
| Purge time (min.) | 27 | 27 | 27 |
| Repress time (min.) | 5.0 | 5.0 | 5.0 |
| Bed layering (active adsorbents): | | | |
| F-200 (⅛ in.) alumina | 9 | 9 | 9 |
| D-201 (7 × 12) alumina | 22.5 | 37.5 | 52.5 |
| PS-201 (7 × 14) composite | 52.5 | 37.5 | 22.5 |
| % First Zone (alumina) in bed | 37.5% | 55.4% | 73.2% |
| $CO_2$ product conc. (ppm) | 0.02 | 0.15 | 1.1 |

It needs to be noted, however, that there is a lower limit to reducing the zone 1 height (e.g., alumina), below which an increasing amount of moisture would enter the zone 2 layer (e.g., the zeolite-alumina composite/mixture layer). As zeolites have a very high affinity for $H_2O$ and are not easily regenerated under PSA conditions, it is recommended to size the alumina layer such that the $H_2O$ front does not propagate significantly into the second zone (e.g., mixed/composite zeolite-alumina layer). In practice, a PSA plant can experience various operational upsets or fluctuations such as feed valve control failure or a drastic rise in moisture content of the feed due to compressor after-cooler failures resulting in a rise in feed temperature. This could introduce an amount of moisture into the adsorbent beds significantly above their design capacity. As the alumina layer is much easier to regenerate under PSA conditions compared to a zeolite-alumina composite/mixture, it is preferable to have an initial alumina layer to allow a relatively rapid recovery from operational upsets.

For a given set of operating conditions, computer simulations or moisture dew point measurements in a pilot plant can be used to determine the location in the bed at which the moisture concentration is diminished to the degree at which it will not significantly affect the zeolite component present in the second zone.

The above example shows that when the composition of the first zone (moisture removal layer) is decreased relative to the second zone (zeolite-alumina layer), the overall capacity of the bed for impurity removal is increased. Thus, this increase in bed capacity can be used advantageously by either increasing the design flow or by increasing the PSA cycle time.

Examples 10-11

Pilot plant experimental tests were conducted to study the impact of layer configuration on the design feed flux at different cycle times as described in Table 7. It may be recalled that in Examples 4 and 5, the pilot plant with 4.26 inch bed diameter was loaded with alumina layers with a combined height of 46.5 inch and a PS-201 composite layer measuring 37.5 inch in height. Thus the first zone corresponded to 55% of the bed. In Examples 10 and 11, the pilot plant with 3.26 inch diameter was loaded with alumina layers with a combined height of 31.5 inch in zone 1. A mixture of 44% 13×APG (8×12) and 56% D-201 (7×12) alumina with a height of 52.5 inch was loaded in zone 2. In Examples 10 and 11, the first zone therefore contained 38% of the bed in accordance with the present invention. Both the beds were subjected to PSA cycles at different cycle times with the P/F flowrate ratio maintained at 50%. In each case, the feed flux was adjusted until the peak $CO_2$ concentration in the product stream reached 0.1 ppm at cyclic steady state. The results of the pilot plant tests are also shown in Table 7.

TABLE 7

PSA cycle conditions for Examples 4, 5, 10 and 11.

| | Example No. | | | |
|---|---|---|---|---|
| | 4 | 5 | 10 | 11 |
| Bed diameter (in.) | 4.26 | 4.26 | 3.26 | 3.26 |
| Layer heights: | | | | |
| F-200 (⅛ in.) alumina | 9 | 9 | 9 | 9 |
| D-201 (7 × 12) alumina | 37.5 | 37.5 | 22.5 | 22.5 |
| PS-201 or 13X APG/D-201 mixture | 37.5 | 37.5 | 52.5 | 52.5 |
| % First Zone (alumina) in bed | 55% | 55% | 38% | 38% |
| Cycle step time: | | | | |
| Feed time (min.) | 25 | 32.3 | 32.3 | 42 |
| Blowdown time (min.) | 0.5 | 0.5 | 0.5 | 0.5 |
| Purge time (min.) | 19.5 | 26.8 | 26.8 | 36.5 |
| Repress time (min.) | 5.0 | 5.0 | 5.0 | 5.0 |
| Feed conditions: | | | | |
| Pressure (psig) | 130 | 130 | 130 | 130 |
| Temp. (° F.) | 105 | 105 | 105 | 105 |
| Feed flow (NCFH) | 1460 | 1350 | 855 | 700 |
| Feed $CO_2$ conc. (ppm) | 400 | 400 | 400 | 400 |
| Feed $H_2O$ conc. (ppm) | 7643 | 7643 | 7643 | 7643 |
| Feed flux (NCFH/ft$^2$) | 14750 | 13639 | 14750 | 12076 |
| Bed specific capacity (NCF/ft$^3$) | 878 | 1049 | 1134 | 1208 |
| Purge conditions: | | | | |
| Purge pressure (psig) | 2 | 2 | 2 | 2 |
| Purge temp. (deg F.) | 95 | 95 | 95 | 95 |
| Purge flow (NCFH) | 730 | 675 | 427.5 | 350 |
| Purge/Feed flow ratio | 50% | 50% | 50% | 50% |

Figure 5:
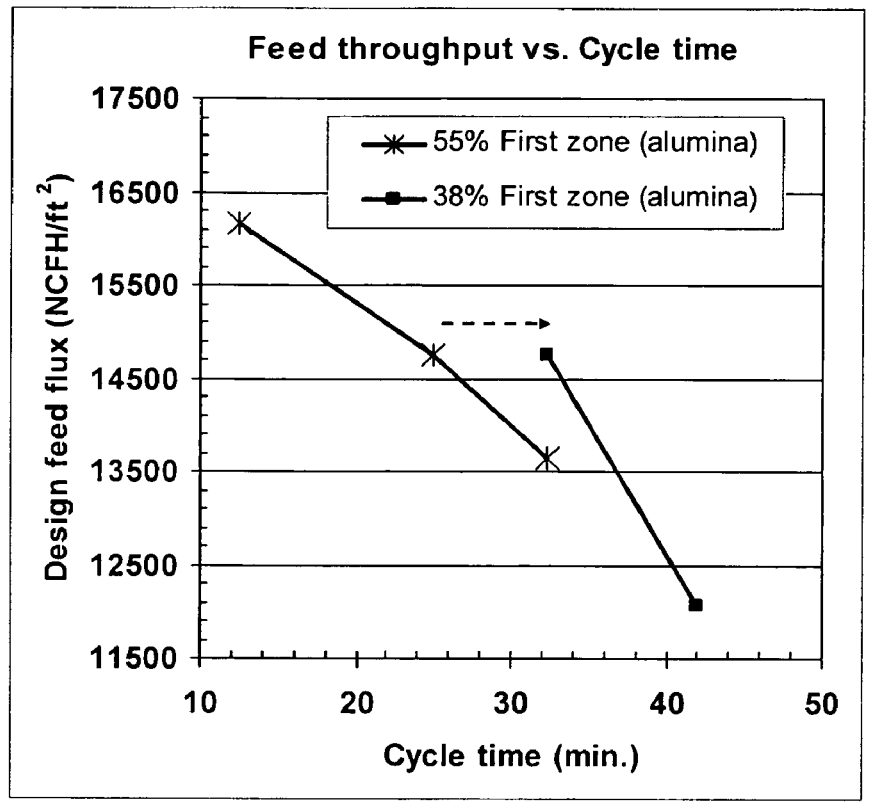
FIG. 5 depicts the effect of cycle time on design feed flux for two different adsorbent configurations corresponding to Examples 4, 5, 10 and 11 described in Table 4.

The design feed flux for the two zone configurations at different cycle times is shown in FIG. 5. It can be observed that the design feed flux with the improved bed configuration for Example 10 at 32.3 minutes cycle time was the same as that in Example 4 at 25 minutes. This demonstrates that the cycle time can be extended by 29% without any noticeable reduction in feed flux by appropriately designing the layer configuration prescribed by this invention. As explained earlier, a longer cycle time results in lower frequency of blowdown loss thus providing savings in feed compression costs. It will also be appreciated by those skilled in the art that the cost difference associated with adjusting the relative amounts of adsorbents in the zones in accordance with the invention would be minimal compared to the total cost of the prepurifier system.

Figure 6:
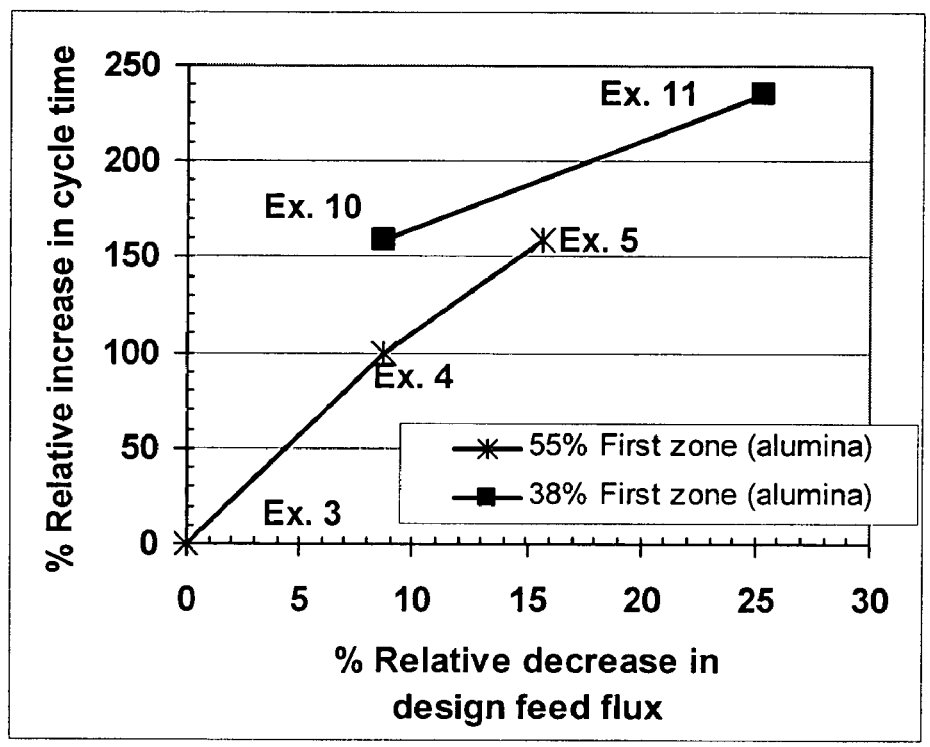
FIG. 6 illustrates the increase in cycle time afforded by a corresponding decrease in design feed flux for a constant product impurity concentration at a fixed purge/feed flow ratio of 50%, the data being relative to Example 3 as a baseline (12.5 minute cycle with a 55% first zone volume).

The decrease in design feed flux as the cycle time is increased in the above examples relative to the baseline case of the 12.5 minute cycle with a 55% first zone bed configuration (Example 3) is shown in FIG. 6. It was evident that a substantial gain in cycle time (100-200%) can be obtained with a relatively modest penalty (10-25%) in the design feed flux, especially if the bed configuration is arranged according to the present invention.

It is to be noted that for a fixed feed flow, a reduction in allowable feed flux translates into an increase in the design flow area of the adsorber vessel. In the case of a cylindrical axial flow vessel, this would require the diameter of the vessel to be increased. The present invention allows the flexibility for one skilled in the art to trade-off the slightly higher capital cost of a larger vessel to obtain a substantial reduction in blowdown loss and decrease the operating cost.

Another implication of the observation in FIG. 6 relates to the operation of a prepurifier plant in a turndown mode. In situations where there is a temporary reduction in the customer demand for product flow, feed flux to the plant will be reduced. FIG. 6 therefore suggests that the plant cycle time could be increased in a proportion much greater than the imposed reduction in the operating feed flux, so as to reap the benefit of a decreased blowdown loss and therefore reduced compression power. Those skilled in the art will appreciate that such a cycle time manipulation could be deployed by a trained operator or by using an automated control system using the plant feed flow as an input.

Example 12

A field test was conducted at a small commercial scale two-bed PSA air prepurification plant. The vessels each had an inner diameter of 30 in. and were loaded with a bed layering as described in Table 8. The bed adsorbents were supported at the bottom by two layers of Denstone D57 ceramic ball supports of graded size: a 6 in. layer of 1 in. balls followed by a 3 in. layer of ½ in. balls. The first zone was comprised of three layers of alumina of graded bed size as follows: 3 in. layer of Alcoa F-200 alumina of ¼ in. bead size, 8 in. layer of UOP D-201 alumina of 5×8 bead size, and 22.5 in. layer of UOP D-201 alumina of 7×12 bead size. The second zone was comprised of a 52.5 in. layer of a homogenous bead mixture of 43 weight % UOP 13×APG (8×12) sieve and 57 weight % UOP D-201 (7×12) alumina. Thus, the first zone consisted of 39% of the total volume of first and second zones in accordance with the invention. On top of the second zone, two layers of Denstone D57 ball supports (a 9 in. layer of ½ in. sized ball supports followed by a 3 in. layer of 1 in. ball supports) were added to evenly distribute the flow and provide ballast to the adsorbent. The PSA plant was tested over four months of continuous operation during which the operating conditions varied to some extent due to variable demand and changing ambient weather conditions. Specifically, the bed pressure varied from 118-120 psig, the feed air flow varied from 44,000-48,000 NCFH, the feed temperature varied from 77-120° F., the purge flow varied from 23,000-27,000 NCFH, and the purge temperature varied from 33-63° F. The results shown in Table 8 are representative of the plant performance approximate to cyclic steady state conditions.

TABLE 8

Layered bed active adsorbent bed zone configuration and representative PSA cycle conditions and results for Example 12.

| | Example No. 12 |
|---|---|
| Bed inner diameter (in.) | 30 |
| Layer heights: | |
| Zone 1: | |
| F-200 (¼ in.) alumina | 3 |
| D-201 (5 × 8) alumina | 8 |
| D-201 (7 × 12) alumina | 22.5 |
| Zone 2: | |
| 43% 13X APG/57% D-201 mixture | 52.5 |
| % First Zone (alumina) in bed | 39% |
| Cycle step time: | |
| Feed time (min.) | 36.55 |
| Blowdown time (min.) | 1.17 |
| Purge time (min.) | 32 |
| Repress time (min.) | 3.38 |
| Feed conditions: | |
| Pressure (psig) | 119 |
| Temp. (° F.) | 106 |
| Feed flow (NCFH) | 46,000 |
| Feed $CO_2$ conc. (ppm) | ~400 |
| Feed $H_2O$ conc. (ppm) | 8484 |
| Feed flux (NCFH/ft$^2$) | 9371 |
| Specific bed capacity (NCF/ft$^3$) | 797 |
| Purge conditions: | |
| Purge pressure (psig) | 2 |
| Purge temp. (° F.) | 52 |
| Purge flow (NCFH) | 25,500 |
| Purge/Feed flow ratio | 55.4% |

It was observed that the low purge temperature in the field test (52° F.) reduced the dynamic bed capacity compared to the pilot test which operated at a higher purge temperature of 95° F. However, despite this drawback, a reasonably large cycle time of 36.6 min. with a specific bed capacity of 797 NCF/ft$^3$ was found to be possible at a product $CO_2$ impurity concentration of 0.7 ppm.

It is understood that the above examples of the present invention are illustrative and are not to be construed as limiting. Alternative embodiments are within the scope of the present invention. For example, the PSA cycle may be modified to include additional steps such as pressure equalization, product pressurization and the like. In addition, one bed or more than two beds could be used in the process, with one or more beds receiving feed at any given time. Moreover, the bed geometry and flow direction could also be altered to suit the process needs. For example and while not to be construed as limiting, vertical (axial) flow cylindrical vessels, horizontal beds, lateral flow, or radial flow vessels may be used.

As discussed above, the first zone is designed primarily for $H_2O$ removal. Thus the first zone should be composed of one or more layers of adsorbents with a high capacity for $H_2O$ with the ability of being easily regenerated under PSA conditions. Some examples of such adsorbents are activated alumina, silica gel, silica-alumina composites and mixtures thereof. These adsorbents are preferably layered in graded sizes (¼ in., ⅛ in., etc.) so as to provide efficient flow distribution and bed support.

As also discussed above, the second zone of the bed is designed primarily for $CO_2$, $N_2O$ and hydrocarbon removal, as well as the final cleanup of water from the feed gas.

Further, it may be possible to employ different particle sizes for the alumina, zeolite or composite adsorbents to enhance mass transfer or to alter the pressure drop characteristics of the bed. The above concepts could also be applied to a range of process conditions such as feed and purge pressure, temperature, and purge to feed ratio.

It is noted that for an efficient PSA operation, the adsorbents used should be kept sufficiently dry. Appropriate care is to be taken during the manufacture, shipping, storage and loading of the adsorbent into the vessels to avoid any moisture contamination. Severe moisture contamination is likely to inhibit the capacity of the adsorbent to adsorb the impurities and could drastically reduce the PSA performance.

Moreover, the above configuration basically describes a bed with two adsorbent zones, however it is within the scope of the invention to add additional zones of different adsorbents on top of the second zone which are functionalized for removal of certain additional impurities such as nitrogen oxides, hydrocarbons, CO, $H_2$, etc. Inert ball supports such as ceramic balls could be optionally used either below the first zone for improving bed support, flow distribution and provide regenerative thermal cooling to the feed flow. In addition, inert ball supports can also be used above the second zone to provide ballast and prevent fluidization of the adsorbent and distribute the flow. Moreover, inert ball supports can be used below the first zone as well as above the second zone.

The above invention is primarily geared towards the prepurification of air prior to cryogenic distillation. Other applicable separations include removal of impurities such as moisture, $CO_2$, hydrocarbons, etc. from any inert gas stream such as $N_2$, Ar, He, $H_2$ or the like.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A pressure swing adsorption process for purifying a gas stream containing at least water and carbon dioxide as impurities, the process comprising: passing the gas stream over at least one bed containing at least two zones of adsorbents in an adsorption step, the first zone positioned proximate to a feed end of the at least one bed, the first zone comprising at least one layer having at least one first adsorbent and the second zone positioned such that the gas stream passes over the second zone after passing over the first zone, the second zone comprising at least second and third adsorbents combined as a mixture or a composite, the at least one first adsorbent selected from the group comprising: activated alumina, silica gel or mixtures thereof; the second adsorbent selected from the group comprising: activated alumina, silica gel or mixtures thereof; and the third adsorbent comprising a zeolite or mixture of zeolites;
   wherein the volume of the first zone comprises not more than 50% by volume of the total volume of the first and second zones.

2. The process of claim 1, wherein the gas stream to be purified comprises air.

3. The process of claim 2, wherein the air is purified prior to being fed to a cryogenic air distillation unit.

4. The process of claim 1, wherein the volume of the first zone comprises not more than 45% by volume of the total volume of the first and second zones.

5. The process of claim 4, wherein the volume of the first zone comprises not more than 40% by volume of the total volume of the first and second zones.

6. The process of claim 1, wherein the at least one first adsorbent comprises activated alumina.

7. The process of claim 6, wherein the volume of the first zone comprises not more than 45% by volume of the total volume of the first and second zones.

8. The process of claim 6, wherein the first zone comprises at least two layers, the at least two layers having different sizes of activated alumina to facilitate at least one of flow distribution and bed support.

9. The process of claim 8, wherein the layer of alumina proximate to a feed end of the at least one bed contains alumina particle sizes larger than the layer of alumina proximate to the second zone of the at least one bed.

10. The process of claim 9, wherein the volume of the first zone comprises not more than 45% by volume of the total volume of the first and second zones.

11. The process of claim 1, wherein the at least one first adsorbent comprises silica gel.

12. The process of claim 11, wherein the volume of the first zone comprises not more than 45% by volume of the total volume of the first and second zones.

13. The process of claim 11, wherein the first zone comprises at least two layers, the at least two layers having different sizes of the silica gel to facilitate at least one of flow distribution and bed support.

14. The process of claim 1, wherein the second adsorbent comprises at least activated alumina.

15. The process of claim 14, wherein the third adsorbent comprises at least zeolite.

16. The process of claim 15, wherein the second and third adsorbents comprise a mixture of the at least activated alumina and the at least zeolite.

17. The process of claim 15, wherein the mixture of the activated alumina and the zeolite comprises a variable composition mixture.

18. The process of claim 17, wherein the variable composition mixture includes a mixture of at least 5 weight percent zeolite and 95 weight percent activated alumina at a first end of the second zone proximate to the first zone and the mixture is characterized by a composition gradient that results in a composition of at most 80 weight percent zeolite and 20 weight percent activated alumina at a second end of the second zone proximate to the product end of the vessel.

19. The process of claim 17, wherein the zeolite comprises a 13× zeolite.

20. The process of claim 16, wherein the zeolite comprises a 13× zeolite.

21. The process of claim 15, wherein the zeolite includes at least one cation from Group 1A, 1B, 2A, 2B, 3B, 7B, 8 of the Periodic Table or combinations of such cations.

22. The process of claim 21, wherein the cation in the zeolite comprises $Na^+$.

23. The process of claim 1, wherein the at least second and third adsorbents comprise a composite.

24. The process of clam 23, wherein the second adsorbent comprises activated alumina.

25. The process of claim 24, wherein the third adsorbent comprises zeolite.

26. The process of claim 25, wherein the zeolite includes at least one cation from Group 1A, 1B, 2A, 2B, 3B, 7B, 8 of the Periodic Table or combinations of such cations.

27. The process of claim 26, wherein the cation in the zeolite comprises $Na^+$.

28. The process of claim 25, wherein the at least one first adsorbent comprises activated alumina.

29. The process of claim 28, wherein the volume of the first zone comprises not more than 45% by volume of the total volume of the first and second zones.

30. The process of claim 28, wherein the first zone comprises at least two layers, the at least two layers having different sizes of activated alumina to facilitate at least one of flow distribution and bed support.

31. The process of claim 30, wherein the layer of alumina proximate to a feed end of the at least one bed contains alumina particle sizes larger than the layer of alumina proximate to the second zone of the at least one bed.

32. The process of claim 31, wherein the volume of the first zone comprises not more than 45% by volume of the total volume of the first and second zones.

33. An adsorbent vessel for a pressure swing adsorption system for purifying a gas stream containing at least water and carbon dioxide as impurities, the vessel comprising:
a bed containing at least two zones of adsorbents, the first zone positioned proximate to a feed end of the bed, the first zone comprising at least one layer having at least one first adsorbent and the second zone positioned such that the gas stream passes over the second zone after passing over the first zone, the second zone comprising at least second and third adsorbents combined as a mixture or a composite, the at least one first adsorbent selected from the group comprising: activated alumina, silica gel or mixtures thereof; the second adsorbent selected from the group comprising: activated alumina, silica gel or mixtures thereof; and the third adsorbent comprising a zeolite or mixture of zeolites; wherein the volume of the first zone comprises not more than 50% by volume of the total volume of the first and second zones.

34. The vessel of claim 33, further including the gas stream to be purified, wherein the gas stream comprises air.

35. The vessel of claim 34, wherein the purified air is further separated in a cryogenic air distillation unit.

36. The vessel of claim 33, wherein the volume of the first zone comprises not more than 45% by volume of the total volume of the first and second zones.

37. The vessel of claim 36, wherein the volume of the first zone comprises not more than 40% by volume of the total volume of the first and second zones.

38. The vessel of claim 33, wherein the at least one first adsorbent comprises activated alumina.

39. The vessel of claim 38, wherein the volume of the first zone comprises not more than 45% by volume of the total volume of the first and second zones.

40. The vessel of claim 38, wherein the first zone comprises at least two layers, the at least two layers having different sizes of activated alumina to facilitate at least one of flow distribution and bed support.

41. The vessel of claim 40, wherein the layer of alumina proximate to a feed end of the at least one bed contains alumina particle sizes larger than the layer of alumina proximate to the second zone of the at least one bed.

42. The vessel of claim 40, wherein the volume of the first zone comprises not more than 45% by volume of the total volume of the first and second zones.

43. The vessel of claim 33, wherein the at least one first adsorbent comprises silica gel.

44. The vessel of claim 43, wherein the volume of the first zone comprises not more than 45% by volume of the total volume of the first and second zones.

45. The vessel of claim 43, wherein the first zone comprises at least two layers, the at least two layers having different sizes of the silica gel to facilitate at least one of flow distribution and bed support.

46. The vessel of claim 33, wherein the second adsorbent comprises at least activated alumina.

47. The vessel of claim 46, wherein the third adsorbent comprises at least zeolite.

48. The vessel of claim 47, wherein the second and third adsorbents comprise a mixture of the at least activated alumina and the at least zeolite.

49. The vessel of claim 48, wherein the mixture of the activated alumina and the zeolite comprises a variable composition mixture.

50. The vessel of claim 49, wherein the variable composition mixture includes a mixture of at least 5 weight percent zeolite and 95 weight percent activated alumina at a first end of the second zone proximate to the first zone and the mixture is characterized by a composition gradient that results in a composition of at most 80 weight percent zeolite and 20 weight percent activated alumina at a second end of the second zone proximate to the product end of the vessel.

51. The vessel of claim 49, wherein the zeolite comprises a 13× zeolite.

52. The vessel of claim 48, wherein the zeolite comprises a 13× zeolite.

53. The vessel of claim 48, wherein the zeolite includes at least one cation from Group 1A, 1B, 2A, 2B, 3B, 7B, 8 of the Periodic Table or combinations of such cations.

54. The vessel of claim 53, wherein the cation in the zeolite comprises $Na^+$.

55. The vessel of claim 33, wherein the at least second and third adsorbents comprise a composite.

56. The vessel of clam 55, wherein the second adsorbent comprises activated alumina.

57. The vessel of claim 56, wherein the third adsorbent comprises zeolite.

58. The vessel of claim 57, wherein the zeolite includes at least one cation from Group 1A, 1B, 2A, 2B, 3B, 7B, 8 of the Periodic Table or combinations of such cations.

59. The vessel of claim 58, wherein the cation in the zeolite comprises $Na^+$.

60. The vessel of claim 57, wherein the at least one first adsorbent comprises activated alumina.

61. The vessel of claim 60, wherein the volume of the first zone comprises not more than 45% by volume of the total volume of the first and second zones.

62. The vessel of claim 61, wherein the first zone comprises at least two layers, the at least two layers having different sizes of activated alumina to facilitate at least one of flow distribution and bed support.

63. The vessel of claim 62, wherein the layer of alumina proximate to a feed end of the at least one bed contains alumina particle sizes larger than the layer of alumina proximate to the second zone of the at least one bed.

64. The vessel of claim 63, wherein the volume of the first zone comprises not more than 45% by volume of the total volume of the first and second zones.

* * * * *